Patented June 27, 1939

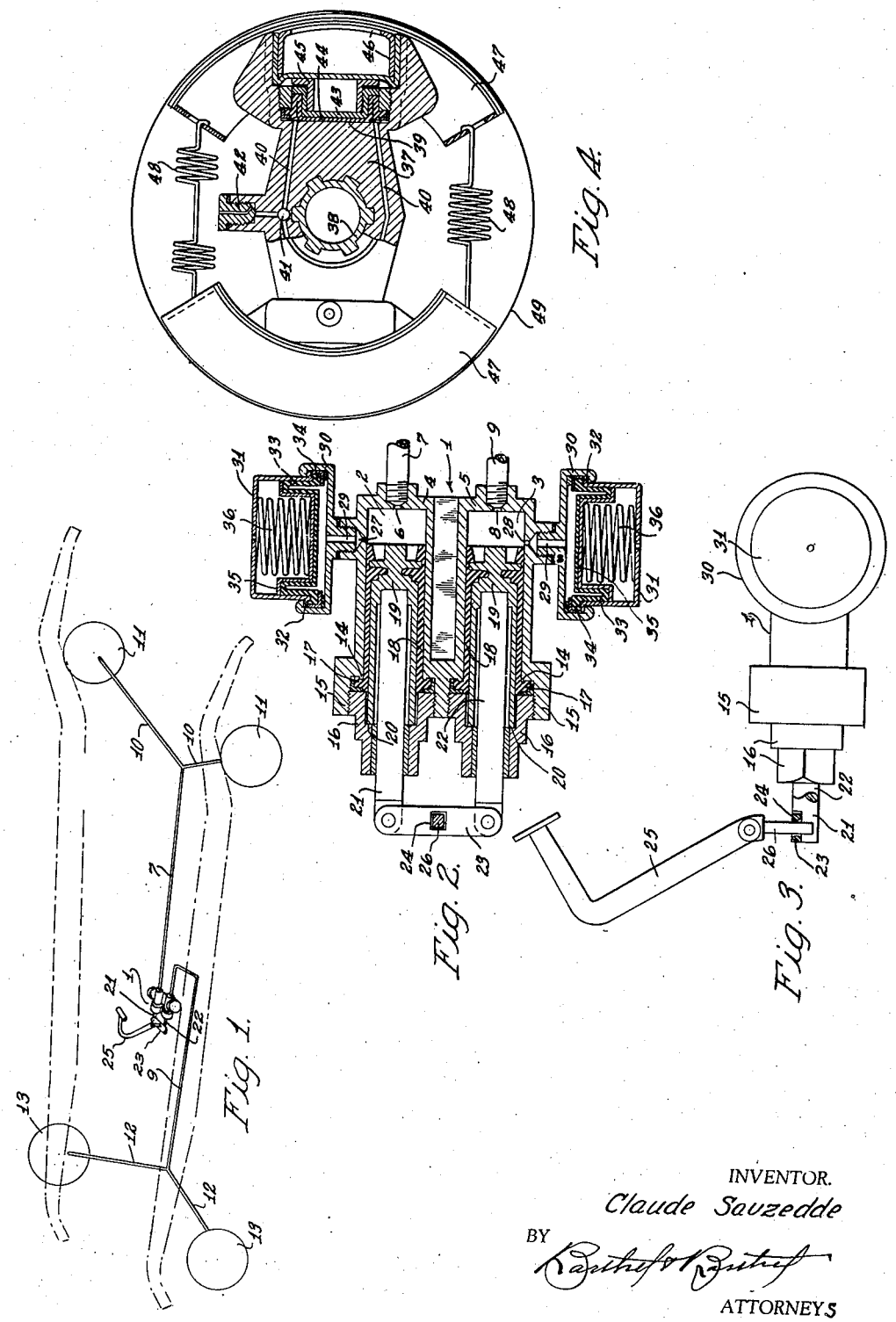

2,163,633

UNITED STATES PATENT OFFICE 2,163,633

HYDRAULIC BRAKE SYSTEM

Claude Sauzedde, Detroit, Mich., assignor to Detroit Hydrostatic Brake Corporation, Detroit, Mich., a corporation of Michigan Application July 8, 1935, Serial No. 30,232

8 Claims. (Cl. 188—152)

The present invention relates to hydraulic brakes for automotive vehicles, aircraft and the like.

The primary object of the present invention is to provide means for maintaining an adjusted relationship between the brake shoes and the braking surfaces in hydraulic brake systems and to avoid the necessity of readjusting the brakes when temperature conditions change. It is well known that in certain well known types of hydraulic brakes the relationship between the brake shoes and the braking surfaces must be adjusted to compensate for volumetric changes in the liquid of the system resulting from expansion or contraction of the liquid due to temperature changes resulting from changing climatic conditions. When the liquid expands it has a tendency to apply or partially apply the brakes and when it contracts it results in a lost-motion connection between the pressure applying member and the brake shoes. The invention automatically compensates for either expansion or contraction of the liquid and permits the brakes to function normally under various temperature and climatic conditions.

Another object of the present invention is to provide a pressure applying device for hydraulic brakes of the type having springs for retracting the brake shoes when the system is inoperative, the device including a resiliently expansible and contractible auxiliary chamber for containing liquid. If an excessive volume of liquid is present in the system the auxiliary chamber facilitates removal thereof from the system so that the springs may function to fully retract the brakes and if the volume of liquid is not sufficient to completely fill the system the system is automatically replenished by liquid from the auxiliary chamber.

With the above and other ends in view the invention is fully disclosed by way of example in the following description, reference being had to the accompanying drawing, in which Fig. 1 is a diagrammatic illustration of the brake system;

Fig. 2 is a horizontal cross section of the pressure member;

Fig. 3 is a side elevation of the pressure member, and

Fig. 4 is a view, partly in cross section, of a brake.

Like characters of reference are employed throughout to designate corresponding parts.

Referring more particularly to Fig. 2 the invention comprises a means for manually applying pressure on liquid in a brake system. The pressure means is generally designated by the numeral 1. It comprises a body formed with two cylindrical chambers 2 and 3, the axes of the chambers being made parallel for convenience in manufacture and assembly. One end of each chamber is closed by an end wall 4 and 5 respectively, the wall 4 having a port 6 to which a conduit 7 is connected and the wall 5 having a port 8 to which a conduit 9 is connected. As shown in Fig. 1 the conduit 7 has branches 10 leading to the two rear brakes 11 and the conduit 9 has two branches 12 leading to the two front brakes 13 of an automobile brake system.

Shoulders 14 are formed at the other ends of the chambers 2 and 3 and internally threaded annular parts 15 surround the shoulders 14 and receive externally threaded elements 16. Flanges 17 on flexible seals 18 are tightly interposed between the ends of the elements 16 and the shoulders 14 and in the seals 18 are supported metallic plungers 19. Movement of the plungers 19 in their respective chambers is limited by engagement with shoulders 20 formed in the elements 16.

Extending through axial bores in the elements 16 are rods 21 and 22. One end of the rod 21 engages the plunger 19 in the chamber 2 and one end of the rod 22 engages the plunger 19 in the chamber 3. The ends of the rods 21 and 22 which extend outwardly of the elements 16 are connected by a cross link 23 having an angular aperture 24 therein. A foot pedal 25 adapted to be pivotally supported in a vehicle in the usual manner has an angular part 26 extending through the aperture 24.

When the plungers 19 are in their normal or inoperative position their ends will be in engagement with the shoulders 20 and their other ends will be spaced from the end walls 4 and 5 substantially as shown in Fig. 2. The side walls of the chambers 2 and 3 are provided with radially extending ports 27 and 28 disposed, as regards to the length of the chambers, so that they are not covered by the seals 18 or plungers 19 when the latter are in their inoperative position and so that upon a slight movement of the plungers, as will be hereinafter more particularly described, both ports 27 and 28 will be covered.

The ports 27 and 28 communicate with passages 29 in annular bodies 30 having caps 31 formed with flanges 32. The annular bodies 29 have their walls bent over to engage the flanges 32 to permanently secure the caps 31 with respect thereto. A double cupped seal 33 is provided in each of the bodies 29 and each seal has a flange 34 tightly interposed between the flanges 32 and the respective bottoms of the annular bodies 29. The seals 33 are reinforced by metal cups 35 and coil springs 36 are compressed between the cups 35 and their respective caps 31.

In order that the function of the invention may be more readily understood there is illustrated a hydraulic brake of a type with which the invention has particular utility. The brake is shown in Fig. 4 in which the numeral 37 designates a spider splined on an axle 38. The spider has a plurality of annular recesses 39 and passages 40 interconnecting the recesses and also connecting them to a main supply conduit 41 and to an air bleeder valve 42. In each recess 39 is a plunger 43 and a flexible sealing member 44. The plunger 43 supports an adjustable element 45 which engages a bracket 46 supporting brake shoes 47. In the illustration two sets of shoes 47 are provided and they are connected by springs 48 which function to retract the shoes and to move the plungers 43 inwardly of the annular recesses 39. In the event that fluid under pressure is supplied in the conduit 41 the plungers 43 and shoes 47 will be moved outwardly and into contact with the braking surface which is diagrammatically represented by the line 49. For an understanding of the invention it will be assumed that one of the branches 10 or 12 is connected to the conduit 41 and that the remaining conduits are connected to similar conduits in similar brakes.

When the pedal 25 is moved through application of manual pressure thereon the part 26 engages a side wall of the aperture 24 and moves the connecting member 23 and rods 21 and 22. Movement of the rods 21 and 22 pushes the plungers 19 to a position where the seals 18 cover the ports 27 and 28 and continued movement after the ports 27 and 28 are covered moves the liquid from the chambers 2 and 3 into the conduits 7 and 9. The liquid is thus supplied under pressure to the conduit 41 with the result that the plungers 43 move the shoes 47 outwardly and into engagement with the braking surface 49. The brakes are thus applied.

As will be seen by a comparison of Figs. 2 and 4, the piston chamber of the piston and cylinder assembly of the actuator mechanism is in permanently-open communication with the conduit 41 and through conduits 40 with the chamber of the brake applying elements. Hence, movement of the brake pedal—counter-clockwise in Fig. 3—will serve to force fluid from the piston chamber into the channel connections and thus shift the piston for the brake-shoe operation in the direction to apply the brakes. When the brake pedal is released, the springs 48 become active as a power source, tending to move the brake shoes inward and away from braking contact, thus causing the piston of the unit to drive fluid from the unit piston chamber into the connections and thus back into the piston chamber of the actuator mechanism. During the brake-setting movement the pedal pressure is obviously greater than the pressure of springs 48, but when the pedal is released, the springs 48 provide the power pressure since the brake pedal does not then set up an opposing pressure; when the pedal pressure is released by the operator, he loses control of the returning movement excepting that it is possible for him to provide a gradual release of braking pressure by preventing pedal movement by the power of springs 48 by retaining his foot on the pedal instead of definitely removing it, so that the release can be controlled in this way, if desired.

In other words, the fact that the piston chamber of the actuating mechanism and that of the unit carrying the brake-applying element are in open communication, with the pedal control active only as a possible retarding member during the brake release movement, tends to retain the fluid of the chambers and connections under substantially constant pressure of a definite value, with the fluid acting in the nature of a mobile piston. This is made possible by the fact that the port communication with the auxiliary supply means, represented by 30, is open to the piston chamber of the actuating mechanism only when the piston 19 is substantially in its inactive position. As soon as the piston advances a sufficient distance to close this port communication, the volume of the mobile piston becomes fixed in amount, so that further advance of the piston is against the power of the springs 48, and since the volume cannot then be changed, the pressure applied to the brake shoes is the excess applied to the pedal over the resistance of springs 48.

However, when the piston is in its inactive position, as in Fig. 2, the port communication is open to the auxiliary supply chamber 30, thus bringing into activity the power of spring 36—of less power than springs 48. This brings into action a number of conditions. For instance, assume that the brake application has been such that considerable heat has been developed and that such heat has resulted in a slight expansion of the fluid; as long as the brake pedal carries the excess power the fluid expansion would be effective as against either the pedal or the brake-applying piston, or both; when, however, the pedal is released, springs 48 become active to move the mobile piston in the opposite direction, and since the expansion has tended to increase the space required for the fixed volume, the piston will reach its port-opening position before the brake-element piston has reached its inactive position, so that the respective powers of the two sets of springs 36 and 48 become active—as spring 48 has the greater power the excess fluid will pass into the supply chamber; should the fluid cool while in this position and thus tend to decrease the space required, spring 36 becomes active to restore the volume of the mobile piston to that which is set by the power of spring 36, springs 48 preventing yielding of the brake-applying piston during this compensation action, due to the superiority of power of springs 48. Hence, when the next brake application takes place, the volume of the mobile piston will be that which has been set.

If there has been no expansion of the mobile piston, opening of the port to the supply chamber will not vary the volume unless the pedal should have, at such time, a greater power than spring 36—if the pedal is released, its power is less than that of spring 36 and since the volume is the same as when the port had been closed at the beginning of the brake application, it will remain constant and the supply chamber is unaffected. Since the port remains open excepting during a particular brake application, normal temperature changes which might set up expansion or contraction of the mobile piston do not change the conditions since the piston chamber of the actuating mechanism does not change dimensions, and the superior power of springs 48 prevents yield within the connections, so that any excess passes into the supply chamber; should the temperature change be in a lowered direction sufficient to tend to contract the fluid, the fact that the actuator piston chamber does not change dimensions—the pedal being inactive—the fluid content presents a decrease in resistance and spring 36 becomes active to set up the former pressure on the piston.

This is made possible through the fact that the system is itself sealed into what may be termed a "closed system", in that all points where it would be possible for air to leak into or out of the fluid flow path are completely sealed by the several sealing structures disclosed, so far as involuntary supply or discharge is concerned; provision is made to bleed the system of air on initial filling, or when replenishing a supply, as in the case of accident, but such condition is a voluntary action, with the operator having knowledge of the condition and therefore able to remove the air through the safety valve 42. In other words, admission or even seepage of air into the flow path of the fluid is prevented by completely sealing all vulnerable points. With this condition present, and the superiority in power of springs 48 over spring 36, and the superiority in power of the latter over the inactive pedal, ensuring that the actuator piston will return to its inactive position and thus limit the dimensions of the actuator piston chamber, change in volume, except as indicated, and the development of suction conditions which would tend to cause air to seep into the flow path, are eliminated.

Although a specific embodiment has been illustrated and described it will be understood that various changes may be made within the scope of the appended claims without departing from the spirit of the invention, and such changes are contemplated.

What I claim is:

1. In hydrostatic braking systems, wherein each unit to be braked carries brake-applying elements movable to brake-applying position by fluid pressure and away from such position by spring pressure, and wherein actuator mechanism includes a piston and cylinder assembly for providing a piston chamber of definite dimensions and having its piston movements operative to vary the active dimensions of the chamber and to produce fluid pressure to apply the brakes by brake pedal operation, the combination with such structure, of means operative to control the volume of fluid between the piston and the brake-applying elements while maintaining open communication between the piston chamber of the actuating mechanism and the brake applying elements, said control means including a variable fluid storage chamber with the chamber fluid under spring pressure of less value than the spring pressure value operative to move the brakes away from applied position, said means also including port communication between such storage chamber and the piston chamber of the mechanism with the portage forming the sole communication between the chambers, said port communication being controlled as to activity and inactivity solely by the piston functioning as a portage cut-off and with communication activity limited to periods when the piston is substantially in its inactive position to thereby limit changes in the volumetric value of the active fluid content of an individual braking activity to the period between the close of one activity and the beginning of the succeeding activity to cause successive braking activities to be provided under equal volumetric value conditions, change-compensating activities being provided by the differential in pressure between the spring pressures respectively active in returning the brakes and in the means providing chamber fluid pressure and with the differential activity limited to the period between successive braking activities.

2. A system as in claim 1 characterized in that means are provided for sealing the actuator mechanism, the brake-applying elements and the fluid connections therebetween against involuntary influx or escape of air to the fluid content of the system.

3. A system as in claim 1 characterized in that the port communication between the storage chamber and the piston chamber is controlled as to activity and inactivity by a cylinder-contacting wall of the piston.

4. A system as in claim 1 characterized in that the port communication between the storage chamber and the piston chamber extends to the inner face of the piston cylinder wall, whereby the advancing movement of the piston within the cylinder from its inactive position serves to close such port by a peripheral wall of the piston.

5. A system as in claim 1 characterized in that the cylinder assembly includes a stop formation co-operative with the piston to limit the stroke of the piston in the direction of brake-release movement, the wall of the cylinder carrying the cylinder entrance of the port communication with the storage chamber at a point where the piston will unclose such entrance as it closely approaches such stroke-limit position.

6. A system as in claim 1 characterized in that the piston and cylinder formation, the storage chamber formation, and the brake-applying element formation each include an expansible seal structure effective to isolate the flow-path of the fluid against involuntary influx and discharge of air to or from such flow path, whereby a closed system is provided.

7. A system as in claim 1 characterized in that the piston and cylinder formation, the storage chamber formation, and the brake-applying elements each include an expansible seal structure anchored to a non-movable portion of the formation with which it is associated, said seal structures being effective to isolate the flow-path of the fluid against involuntary influx and discharge of air to or from such flow path.

8. A system as in claim 1 characterized in that the piston and cylinder formation, the storage chamber formation, and the brake-applying element formation each include an expansible seal structure effective to isolate the flow-path of the fluid against involuntary influx and discharge of air to or from such flow path, means being provided to provide voluntary discharge of air to the flow path at will.

CLAUDE SAUZEDDE.